Patented Jan. 29, 1924.

1,482,357

UNITED STATES PATENT OFFICE.

CARLETON ELLIS, OF MONTCLAIR, NEW JERSEY.

CASTING SYNTHETIC RESIN.

No Drawing.   Application filed September 26, 1922.   Serial No. 590,672.

*To all whom it may concern:*

Be it known that I, CARLETON ELLIS, a citizen of the United States, and a resident of Montclair, in the county of Essex and State of New Jersey, have invented certain new and useful Improvements in Casting Synthetic Resin, of which the following is a specification.

This invention relates to a casting and the process of making same and relates particularly to a casting made from urea and formaldehyde, the color of said casting being a pure white in the preferred embodiment and further relates to the process of producing such cast articles.

Urea reacts with formaldehyde as has been shown by Goldschmidt, Berichte, 1896, 2438; Chem. Ztg. 1897, 46, 460 and 586; Holzer, Berichte 1884, 17, 659; 18, 3302; Tollens, Berichte 1896, 2751; Einhorn and Hamburger Berichte 1908, 41, 24, and Dixon, Trans. Chem. Soc. 1918, 113, 238 and others. One reaction product of an amorphous character forms the essential component of the product of the present invention.

The preparation of a casting mix may be carried out as follows. Urea, preferably alcohol refined to give a pure white product, is dissolved in aqueous formaldehyde solution; the ordinary formalin containing 37 to 40% of $CH_2O$ preferably being employed. To 20 parts by weight of urea 54 parts of the formalin solution may be used.

The urea and formaldehyde are caused to react by the addition of a catalyst e. g. an alkaline substance may be used as a primary catalyst. For this purpose caustic alkali may be used and in the proportion of .4 part dissolved in an equal weight of water. As reaction takes place the mixture heats and eventually becomes turbid. Preferably the reaction is checked at the first appearance of turbidity by the addition of a mild acid or other suitable neutralizing agent. Acetic acid may be used. The neutral solution will keep for an indefinite time and may be used for making casting mixes. The setting of this solution for casting and molding is brought about by the addition of an acid, preferably a strong acid such as hydrochloric or phosphoric, oxalic and the like. Acid salts such as bisulphate or aluminum chloride also may be used. Glycerine, casein, gelatine, Irish moss, algin and other modifying or tempering agents may be added. In the present invention the prime purpose in the preferred embodiment is to make a pure white casting. This of course may be colored or tinted any shade and being white may be suitable colored in delicate shades or to represent ivory etc. The white product resembles porcelain in outward appearance when freshly cast and may be used for receptacles, handles, knobs, ornaments, paper weights, and a multiplicity of other purposes. The term casting is used herein although a molten substance is not necessarily poured. The term embraces also a liquid product or solution which sets and takes the shape of a mold, as if molten material had been used.

The addition of a few drops of hydrochloric acid to a considerable bulk of the neutral solution suffices to start the reaction forming the final or ultimate substance which causes the whole liquid to thicken and form a homogeneous coagulum which gradually hardens until of surprising hardness. The product appears perfectly homogeneous in spite of the large amount of water in the formalin. The proportion of urea and formalin may be varied. The amount of final acid catalyst to use varies with the strength of the acid and the amount added. The mixture heats on addition of the final catalyst and setting may be retarded to some extent by cooling. Enough catalyst should be present to cause a good degree of setting but not so rapidly as to preclude the addition of fillers, when desired, and the pouring of the mixture into molds of plaster of Paris, glass, copper or other materials. Any filler not neutralizing the acid may be used. Plaster of Paris and china clay, silex, ground quartz, titanium oxide and the like may be used for white or porcelain-like articles. Any suitable pigment or dye may be added. Organic fillers such as flock or wood flour may be used. Asbestos also may be incorporated.

When white articles are not desired the urea may not be as good a quality, the formaldehyde may be a brown commercial grade and alkaline catalysts may be used throughout in some cases. Alkalies tend to turn the color of the urea-formaldehyde reaction product over to a brown. Strong alkali in excess may prevent solidification entirely. An acid substance as the final catalyst is best when a snow-white product is required. An acid catalyst may be used throughout in some cases.

The amount of filler added varies with its bulk and usually should not exceed the weight of the organic binder formed by the reaction. Without a filler a high gloss or finish is usually obtained.

The casting may be allowed to stand in the mold a sufficient length of time to become hard enough to handle. This may take from a few minutes to a half hour or longer. The article is then removed and may be exposed to the air freely for a time to allow superficial drying and elimination of formaldehyde odor. This exposure may take place at room temperature or a somewhat elevated temperature. If the water is expelled from the product it becomes transparent and glassy and very hard. A specimen after exposure at ordinary temperature for a week or so could not be decisively scratched by apatite (No. 5 in the score of hardness) but was scratched, although not easily and deeply, by orthoclase (No. 6). The material does not burn resembling bone or ivory. When thin films or chips are held in a flame they do not ignite but swell and finally char. Cast masses may be turned, bored or otherwise machined, to form cigarette holders, pipe bowls and stems, knife handles, beads, etc. The solution may be applied to surfaces where it dries and forms a varnish. Layers of cloth or paper may be cemented with the neutral solution of the reaction product described and reacted to a tenacious binder by heating in a press or clamped together in an oven. Fillers may be impregnated with the aforesaid neutral solution (urea and formaldehyde reacted with an alkali to incipient turbidity, then neutralized) and dried to form a molding powder especially to make white molded articles as described in my copending application. Appropriate derivatives of urea and formaldehyde and their equivalents are of course within the scope of the present invention, without specific enumeration.

What I claim is:

1. A casting resembling porcelain and containing the ultimate reaction product of urea and formaldehyde.

2. A casting of the reaction product of urea and formaldehyde.

3. A white casting of the reaction product of urea and formaldehyde and a white filler.

4. The process which comprises reacting on urea with formaldehyde in the presence of a basic catalyst, neutralizing and acidifying and pouring the solution into molds to solidify.

CARLETON ELLIS.